United States Patent [19]

Fletcher

[11] Patent Number: 5,015,988

[45] Date of Patent: May 14, 1991

[54] TEMPERATURE PROBE

[76] Inventor: Taylor C. Fletcher, 1534 Sunny Crest Dr., Fullerton, Calif. 92635

[21] Appl. No.: 407,329

[22] Filed: Sep. 14, 1989

[51] Int. Cl.$^5$ ............................................. H01C 3/04
[52] U.S. Cl. .................................................. 338/28
[58] Field of Search ................... 338/28, 229; 374/208, 374/163, 179, 183

[56] References Cited

U.S. PATENT DOCUMENTS

| | | | |
|---|---|---|---|
| 3,402,378 | 9/1968 | Catlin et al. | 338/28 |
| 3,866,472 | 2/1975 | Witt | 73/362 |
| 4,276,536 | 6/1981 | Wisnin | 338/23 |
| 4,445,109 | 4/1984 | Naganoma et al. | 338/22 |
| 4,527,909 | 7/1985 | Dale et al. | 374/163 |
| 4,654,623 | 3/1987 | Steinschulte | 338/28 |

Primary Examiner—Marvin M. Lateef

[57] ABSTRACT

A thermistor-type liquid temperature probe which includes a thermistor of low thermal capacity, and thermistor leads of low thermal conductivity. The probe also has low heat dissipation, and exhibits a high output signal level when connected to a measuring circuit. The thermistor itself is electrically isolated from the liquid whose temperature is being measured so that shunt leakage currentg across the thermistor is minimal.

9 Claims, 1 Drawing Sheet

TEMPERATURE PROBE

BACKGROUND OF THE INVENTION

The temperature probe of the invention is primarily although not exclusively intended for use in clinical laboratories for measuring temperatures of serum and reagents in cuvettes. Such cuvettes typically contain 30-1000 microliters of serum and reagent. One objective of the invention is to provide a temperature probe which is constructed to minimize temperature changes in the cuvette as the probe is making its temperature measurements.

The foregoing temperature measurements may be made in two ways. For example, the probe may be inserted into the aqueous solution in a cuvette and a reading made as soon as the indication settles. This typically occurs, for example, within 10 seconds Alternately, the probe may be inserted into a cuvette and left in the aqueous solution in the cuvette for an extended time interval before a measurement is taken.

In the first case it is important that the heat capacity of the probe be minimal, and it is also important that the probe have a fast response time. In the second case it is important that the heat transfer out of the aqueous solution in the cuvette by the probe be minimal. The probe of the present invention is particularly constructed to meet all of the criteria set forth above.

Accordingly, the objectives of the present invention are to provide an inexpensive rugged thermistor-type liquid temperature probe which has long term stability, and which includes a thermistor of low thermal capacity, and which also includes insulated thermistor lead wires of low thermal conductivity.

It is a further objective of the invention to provide such a probe which has low heat dissipation, and which exhibits a high output signal level when connected to a measuring circuit.

In the construction of the probe of the invention, the thermistor itself is electrically isolated from the aqueous solution whose temperature is being measured so that shunt leakage current across the thermistor may be negligible.

DETAILED DESCRIPTION OF THE ILLUSTRATED EMBODIMENT

Figure 1:
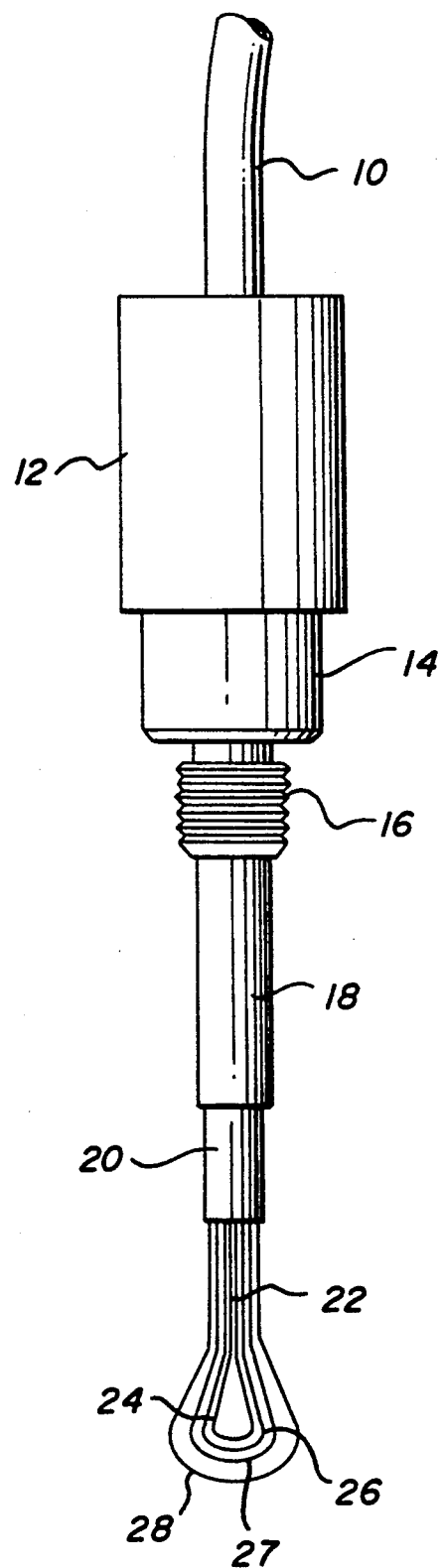
FIG. 1 is a schematic representation of one embodiment of the temperature probe of the present invention.

The assembly illustrated in FIG. 1 includes a casing 12 formed of an appropriate rugged plastic material such as Delrin. A flex cable 10 extends out of one end of the casing, and connects the probe to an appropriate measuring circuit. Casing 12 has a reduced diameter portion 14 which also may be composed of Delrin, and a third portion 16 which is threaded to enable the probe to be mounted on an appropriate support bracket.

In the construction shown in FIG. 1, a post 18, which also may be formed of Delrin, extends downwardly from the threaded portion 16 of the casing, and a thin walled flexible tubular member 20 extends into the post. Tubular member 20 may, for example, be composed of flexible polyvinlchloride. The lead wires of the temperature probe extend into the tubular member 20 to be connected to the flexible copper leads of cable 10 within the casing. The tubular member serves as a strain relief for the lead wires. These lead wires extend downwardly from the end of the tubular member. A thermistor 24 is mounted on the lower end of the lead wires 22, and it is electrically connected to the lead wires.

As mentioned above, in order to accomplish the objectives of the temperature probe of the invention, it is important that the thermal capacity of thermistor 24 be low, that is, the thermistor and its lead wires 22 must be relatively small. It is also important that the thermistor lead wires 22 have low thermal conductivity. Moreover, the heat dissipation of the probe must be as low as possible when connected into a measuring circuit, and the signal output of the thermistor 24 must be as high as possible. In addition, shunt leakage current across the thermistor must be very small. Small amounts of liquid, bridging the thermistor or its leads, will create a shunt resistance path which will cause unacceptable errors. Moisture may also cause unacceptable changes in the intrinsic thermistor (semiconductor) material. Thus it is essential that moisture not penetrate the insulated coating around the thermistor or its leads. Integrity of the moisture barrier may be assesed by measuring the electrical resistance between the thermistor leads and the surrounding liquid. It is also important that the thermistor must have high long term stability, and that the probe itself be rugged in its construction.

The foregoing criteria are met in the temperature probe of the present invention by incorporating the following specifications.

The thermistor 24 is preferably made of manganese nickel oxide with approximately 0.050" maximum dimension, and with the resistance across the thermistor being of the order of 100 kilo-ohms at 25° Centiqrade. Such a thermistor is of a is commercially available for example" from Alpha Thermistor of San Diego, Calif. Various manufacturers use different ratios and doping materials to obtain the desired temperature vs. resistance curve. Lead wires 22 are preferably parallel bifilar No. 32 AWG Constantan (55% copper, 45% nickel) wire with heavy Isomed insulation. "Isomed" is the trademark of the Schenectady Chemical Company for their Polyesterimide enamel.

A thin electrically insulating coating 26 is applied to thermistor 24 to provide electrical isolation from the aqueous solution in the cuvette. Such a coating is preferably composed of "Parylene C" which is the trademark for a film coating produced from di-p-xylylene, a (2.2) paracyclophane which is manufactured and sold by Union Carbide. The actual coating is poly (p-xylylene). However, Parylene C is weak an easily ruptured. To protect the Parylene C, an epoxy coating 27 is applied. A relatively hard epoxy is selected, and it serves mechanically to protect both the Parylene C and the thermistor.

In order to assure minimal electrical conductance between thermistor 24 and the aqueous solution in the cuvette, a second thin epoxy coating 28 is applied over the thermistor and over the insulated lead wires 22. The resulting assembly typically has a $5 \times 10^{10}$ ohm resistance between the thermistor 24 and the aqueous solution.

It should be pointed out that Constantan has a low thermal conductivity compared with other materials normally used for thermistor lead wires, so that upon insertion of the thermistor into the aqueous solution in the cuvette, minimal heat is transferred, even though a portion of the lead wires is in contact with the aqueous solution. This is particularly important when the probe is inserted for long periods of time into the aqueous solution, as the heat transferred through the thermistor lead wires can cause a significant change in the temperature of the small amount of solution in the cuvette.

Also, the use of the Constantan lead wires in conjunction with the PVC strain relief tubular member 20 makes for a more rugged probe than would be provided by normal thermistor lead material with equal thermal conductivity. For example, a copper lead of equal thermal conductivity would only be 22% of the diameter of the Constantan and have a stiffness of only 1/300 of the Constantan. This relatively high tensile strength of the Constantan plus the strain relief provided by tubular member 20 allows for a significant deflection of the thermistor from its normal location before it takes on a permanent set.

The thermistor 24 and lead wires 22 are both relatively small, and the insulation on the lead wires has almost no weight since the isomed insulation is, for example, a tough 0.001 inch thick film. The use of Constantan serves to assure that the lead wires may be relatively small and still accomplish their desired function.

The use of a 100 kilo-ohm thermistor provides a reasonable signal level out of a bridge-type measuring circuit with one or two volts across the thermistor. Thus, the power dissipated at 34° Centigrade (the operating point where the thermistor resistance is 68 kilo-ohms) is between 15 and 60 microwatts, depending upon the voltage of the bridge circuit.

The combination of Parylene over the thermistor 24, and the Isomed insulation over the lead wires 22, and the epoxy overcoats provides excellent electrical insulation. Moreover, the insulation coatings are so thin that good thermal conductivity is still maintained between the aqueous solution in the cuvette and thermistor 24.

The "A" type thermistor material is extremely stable, and the insulation over the thermistor also adds to long term stability.

To reiterate, the temperature probe of the invention has features which include the following:

(1) Fast response time: Time constant less than 0.5 seconds. (Note the response time to final readout is typically 3-4 seconds. It depends upon the desired accuracy and the initial temperature difference.)

(2) Low thermal mass: It is essential that the temperature change in the sample is minimized when the probe is inserted into the sample. (Sample size is typically 200-300 micro liters.)

(3) Low thermal conductivity of leads: The thermistor leads mechanically support the thermistor and transfer heat to or from the sample to the environment. It is important to minimize this heat transfer, particularly when the probe is to be in the sample for an extended period of time.

(4) High electrical isolation from sample: In order to minimize self heating of the thermistor, while applying one to two volt across it, thermistors in the range of 20,000-100,000 ohms are used. Any shunt resistance across the thermistor or between the thermistor leads will cause an error in the temperature reading. The construction of the probe of the present invention typically isolates the probe from the sample liquid by $5 \times 10^{10}$ ohms.

(5) The probe is relatively rugged: The probe of the invention is intended to be used by clinical laboratory technicians who will use only reasonable care.

The inexpensive temperature probe of the invention, as described above, has all the features of glass encapsulated prior art thermistors which are extremely expensive. The thermistor of the present invention, by using the Parylene and epoxy coatings, permits the thermistor resistance to be trimmed before it is encapsulted. Thus one can inexpensively match thermistor characteristics so that units are readily interchangeable. The epoxy/Parylene coatings do not change the thermistor thermal resistance appreciably, whereas the use of a glass coating causes significant changes in thermistor resistance and temperature coefficient.

The invention provides, therefore, a rugged, simple and inexpensive temperature probe which has stability characteristics which nearly equal and other characteristics which surpass those of the more expensive temperature probes of the prior art.

It will be appreciated that while a particular embodiment of the invention has been shown and described, modifications may be made. It is intended in the claims to cover all modifications which come within the true spirit and scope of the invention.

I claim:

1. A temperature probe for measuring temperatures of aqueous solutions comprising: a casing; a pair of insulated low thermal conductivity lead wires extending into said casing and protruding outwardly therefrom; a thermistor type temperature sensor mounted on the distal ends of said lead wires and electrically connected thereto; a thin electrically insulating coating encasing said thermistor to provide electrical insulation from the aqueous solution whose temperature is being measured by the probe; a protective epoxy coating extending over said electrically insulating coating to protect said insulating coating from rupture; and a second epoxy coating extending over said thermistor and over said insulated lead wires to assure minimal electrical conductance between the sensor and the aqueous solution.

2. The temperature probe defined in claim 1, in which said thermistor has a resistance of the order of 100 kilo-ohms at 25° C.

3. The temperature probe defined in claim 1, in which said electrically insulating coating is composed of poly (p-xylylene).

4. The temperature probe defined in claim 1, in which said lead wires are coated with heavy polyesterimide insulation.

5. The temperature probe defined in claim 1, in which said thermistor-type temperature sensor is composed of manganese nickel oxide.

6. The temperature probe defined in claim 1, in which said lead wires are parallel bifilar.

7. The temperature probe defined in claim 6, in which said lead wires are composed of #32 AWG alloy constantum (55% copper, 45% nickel).

8. The temperature probe defined in claim 1, and which includes a strain relief consisting of a flexible tubular member mounted in said casing for receiving said insulated lead wires.

9. The temperature probe defined in claim 8, in which said tubular member is formed of polyvinylchloride.

* * * * *